United States Patent [19]

Spinger et al.

[11] Patent Number: 5,004,389
[45] Date of Patent: Apr. 2, 1991

[54] EXTERNALLY THREADED SELF-LOCKING NUT

[75] Inventors: J. William Spinger, Huron; Eugene Schlett, Sandusky, both of Ohio

[73] Assignee: Industrial Nut Corp., Sandusky, Ohio

[21] Appl. No.: 464,050

[22] Filed: Jan. 12, 1990

Related U.S. Application Data

[63] Continuation-in-part of Ser. No. 205,957, Jun. 13, 1988, abandoned.

[51] Int. Cl.⁵ ............................................. F16B 39/34
[52] U.S. Cl. .................................. 411/304; 411/324; 411/947; 285/92; 285/355
[58] Field of Search ................................ 411/402–410, 411/301–304, 947, 324; 285/347, 355, 39, 92

[56] References Cited

U.S. PATENT DOCUMENTS

| | | | |
|---|---|---|---|
| 1,247,235 | 11/1917 | Diss et al. | 411/301 |
| 1,674,562 | 6/1928 | Mueller et al. | 285/347 |
| 1,726,628 | 9/1929 | Rennerfelt | 411/947 |
| 2,246,436 | 6/1941 | Downey | 411/947 |
| 2,447,535 | 8/1948 | Robinson | 411/947 |
| 2,450,694 | 10/1948 | Sauer | 411/947 |
| 2,618,511 | 11/1952 | Wahlin | 285/347 |
| 2,727,551 | 12/1955 | Rees | 411/303 |
| 3,051,963 | 9/1962 | Hallett, Jr. | 285/39 |
| 3,414,034 | 12/1968 | Imse | 285/355 |
| 3,596,934 | 8/1971 | Decenzo | 285/347 |
| 3,879,071 | 4/1975 | Gockler | 285/355 |
| 4,019,550 | 4/1977 | DeHaitre | 411/947 |
| 4,602,480 | 7/1986 | Hill et al. | 220/3 |
| 4,721,493 | 1/1988 | Lane | 81/177.75 |

FOREIGN PATENT DOCUMENTS

| | | | |
|---|---|---|---|
| 121798 | 4/1944 | Australia | 411/402 |
| 7406144 | 11/1975 | Netherlands | 411/402 |

Primary Examiner—Neill R. Wilson
Attorney, Agent, or Firm—Shlesinger, Arkwright & Garvey

[57] ABSTRACT

A self-locking, externally threaded locking nut the outer periphery of the nut adjacent the threaded portion thereof having an annular groove in which is positioned an elastic ring. Portions of the outer periphery of the elastic ring are deflected outwardly by the nut to form protuberances for effecting increased frictional resistance to turning between the locking nut and a threaded cylindrical body to produce a locking action.

6 Claims, 1 Drawing Sheet

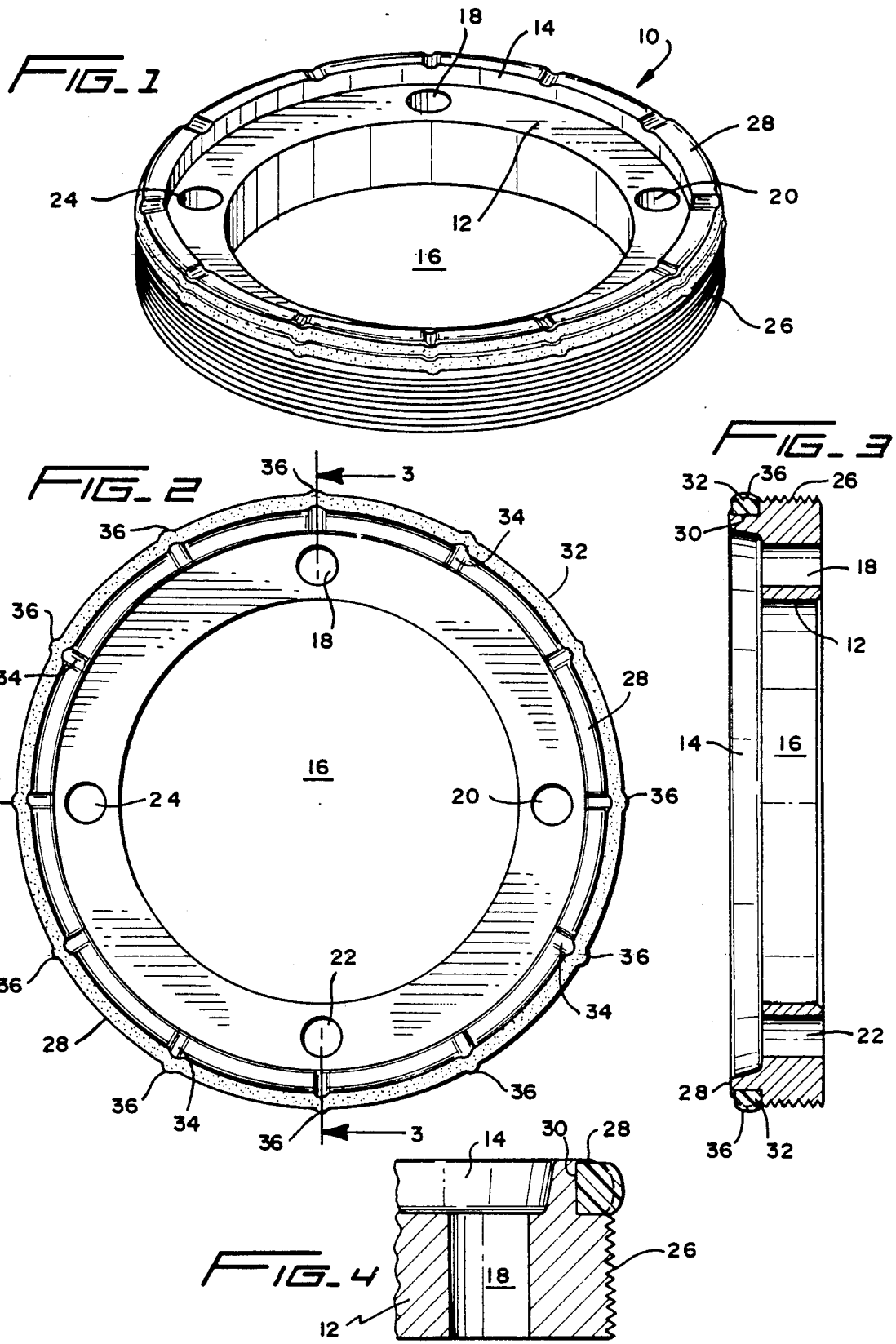

EXTERNALLY THREADED SELF-LOCKING NUT

This invention is a self-locking nut which is externally threaded, and is a continuation-in-part application of application Ser. No. 205,957, filed June 13, 1988 now abandoned.

BACKGROUND OF THE INVENTION

Self-locking nuts of the internally threaded type have been in use for many years as illustrated in U.S. Pat. Nos. 1,726,628 issued Sept. 3, 1929 to T. G. Rennerfelt and 2,450,694 issued Oct. 5, 1949 to J. A. Sauer.

In self-locking nuts of this type, a metallic body is formed with an internally threaded cylindrical body cavity in which cavity is placed an annular cushion of elastic material that provides locking engagement with mating parts. This type of fastening device has proven to be very effective over the years in the use thereof in many different applications.

SUMMARY OF THE INVENTION

The present invention is a self-locking nut wherein, instead of the nut being internally threaded, it is externally threaded for mating engagement with a complemental cylindrical body which is internally threaded.

In accordance with the present invention, an elastic ring is positioned in an annular groove on the outer periphery of the nut adjacent the threaded portion thereof. Portions of the outer periphery of the elastic ring are deflected outwardly by the nut to form protuberances, which effect increased frictional resistance to turning between the locking nut and the cylindrical body to produce a locking action.

DESCRIPTION OF FIGURES OF THE DRAWINGS

FIG. 1 is a perspective view of the self-locking nut of the present invention;

FIG. 2 is a top plan view thereof;

FIG. 3 is a sectional view taken along line 3—3 of FIG. 2, the direction of the arrows; and FIG. 4 is an enlarged fragmentary view of a portion of the view illustrated in FIG. 3.

DESCRIPTION OF THE INVENTION

The self-locking nut of the present invention includes an annular body generally designated 10 comprising an inner annular portion 12 and an outer annular portion 14, which is continguous with the outer periphery of inner annular portion 12. A central opening is indicated at 16.

As shown to advantage in FIGS. 1 and 3, the height of inner annular portion 12 is substantially less than that of outer annular portion 14, with the result that the upper limit of the inner annular portion is below the upper limit of the outer annular portion.

Inner annular portion 12 is provided with a plurality of spaced openings 18, 20 22 and 24 through which pins are attached to a wrenching device which may be inserted to install the lock nut in a mating threaded cavity.

In accordance with the principal objects of the present invention, the outer periphery of outer annular portion 14 is threaded for a substantial portion of the height thereof, as indicated at 26, to enable the nut to be threadedly engaged with a complemental, internally threaded cylindrical member.

As shown in advantage in FIG. 3, threads 26 are in spaced relation to one end of the annular body, which end of outer annular portion 14 is bent outwardly to provide a collar 28, thereby forming a peripheral groove 30 between threads 26 and collar 28 for the reception of an elastic ring 32 which coacts with mating threads of an internally threaded cylindrical member. As shown to advantage in FIGS. 3 and 4, elastic ring 32 extends outwardly to a point which is substantially uniplanar with the outer limits of threads 26. Ring 32 is preferably made of nylon or any other suitable material which will coact with mating threads to produce a locking action.

In order to create the necessary frictional resistance to turning between the self-locking nut and its mating part, the outer surface of collar 28 is crimped at intervals to provide a plurality of pin impressions or indentations 34, each of which effects a corresponding outwardly projecting portion or protuberance 36 in elastic ring 32. The outwardly projecting portions create the necessary frictional resistance to provide the majority of the locking action when the nut is threadedly engaged with a mating support member.

Pin impressions 34 also serve to prevent rotation of the elastic ring relative to the annular body and, together with protuberances 36 which they create, serve as an integral part of the locking elements of the present self-locking nut.

It is preferable that the pin impressions be applied uniformly at pre-determined intervals around the periphery of collar 28 so that protuberances 36 are equally spaced apart. Although any desired number of protuberances may be employed to effect the required frictional resistance, it has been found that the desired locking torque is produced by means of 6 12 protuberances.

In use of the self-locking nut of the present invention, threads 26 are threadedly engaged with the mating threads of an internally threaded cylinder. Upon engagement of protuberances 36 with the mating threads, frictional resistance to turning is produced in order to effect a locking action which will prevent relative movement of the parts in a direction to cause accidental disengagement thereof.

While there has been herein shown and described the presently preferred form of this invention, it is to be understood that such has been done for purposes for illustration only, and that various changes may be made therein within the scope of the appended claims.

What is claimed is:

1. A self-locking nut for threaded engagement with an internally threaded cylindrical member, said nut including:
   (a) an annular body member;
   (b) the outer periphery of said annular body member being threaded for a part of the height thereof, and lying in spaced relation to one end of the body member;
   (c) said one end of said annular body member being bent outwardly to provide a collar, thereby forming a peripheral groove between said threaded part of the annular body member and said collar; and
   (d) an elastic ring mounted in the peripheral groove and adapted to coact with the mating threads of an internally threaded cylindrical member;
   (e) said annular body member collar being crimped to form at least one indentation which engages said elastic ring to form an outwardly extending protuberance on the outer periphery of said elastic ring for creating increased frictional resistance between the outer periphery of said elastic ring and the mating threads of the internally threaded cylinder, to resist relative movement between the nut and the cylindrical member.

2. The self-locking nut of claim 1, wherein:
(a) said annular body member collar is crimped to form a plurality of indentations which engage said elastic ring to form a plurality of outwardly extending protuberances on the outer periphery of said elastic ring.

3. The self-locking nut of claim 2, wherein:
(a) said protuberances are uniformly spaced along the outer periphery of said elastic ring.

4. The self-locking nut of claim 3, wherein:
(a) said uniformly spaced protuberances are in the range of 6 to 12 in number.

5. The self-locking nut of claim 1, wherein:
(a) said annular body member comprises an outer annular portion and an inner annular portion, the height of said inner annular portion being less than that of the outer annular portion.

6. The self-locking nut of claim 5, wherein:
(a) said inner annular portion being provided with a plurality of openings through which pins attached to a wrenching device may be inserted to install the self-locking nut in a mating threaded cavity.

* * * * *

UNITED STATES PATENT AND TRADEMARK OFFICE
CERTIFICATE OF CORRECTION

PATENT NO. : 5,004,389
DATED : April 2, 1991
INVENTOR(S) : J. William Springer, et. al.

It is certified that error appears in the above-indentified patent and that said Letters Patent is hereby corrected as shown below:

On the Title page, item [75], change the name of inventor,

J. William Spinger to J. William Springer.

Signed and Sealed this

Seventeenth Day of August, 1993

Attest:

BRUCE LEHMAN

Attesting Officer     Commissioner of Patents and Trademarks